STRAIGHTENING APPARATUS

Filed Oct. 10, 1949 5 Sheets-Sheet 1

INVENTORS
MARCELLUS S. MERRILL
LAWERENCE W. ALFRED
BY WHITEHEAD & VOGL
PER Earle Whitehead
ATTORNEYS INVENTORS
MARCELLUS S. MERRILL
LAWERENCE W. ALFRED
BY WHITEHEAD & VOGL
PER Carl Whitehead
ATTORNEYS INVENTORS
MARCELLUS S. MERRILL
LAWERENCE W. ALFRED
BY WHITEHEAD & VOGL
PER Earl Whitehead
ATTORNEYS INVENTORS
MARCELLUS S. MERRILL
LAWERENCE W. ALFRED
BY WHITEHEAD & VOGL
PER Carl Whitehead
ATTORNEYS INVENTORS
MARCELLUS S. MERRILL
LAWERENCE W. ALFRED
BY WHITEHEAD & VOGL
PER Carle Whitehead
ATTORNEYS Patented Oct. 19, 1954 2,692,002

UNITED STATES PATENT OFFICE 2,692,002

STRAIGHTENING APPARATUS

Marcellus S. Merrill and Lawrence W. Alfred,
Denver, Colo.

Application October 10, 1949, Serial No. 120,508

11 Claims. (Cl. 153—32)

This invention relates to a straightening and bending apparatus, and more particularly to such apparatus as is used in the repair and straightening of the frames of vehicles such, for example, as automobiles and trucks, and has as an object to provide an improved frame straightening apparatus which may be easily adjusted and applied to straighten any of the various structural members forming the frame and body of a conventional type of motor vehicle, while cold and without disassembly of the vehicle.

Another object of this invention is to provide a new and improved frame straightening apparatus which may be readily moved adjacent, and set and adjusted to, a given structural member, and then actuated by portable remote control means whereby the operator may view the progress of the straightening operation of the structural member at selected positions and at the same time to actuate and control the apparatus.

A further object of this invention is to provide a new and improved frame straightening apparatus which is easily portable and adjustable on a flat shop floor, thereby eliminating the necessity of floor pits or elevated ramps as now commonly used in frame straightening operations and which also may be installed in a floor pit or on a conventional elevated ramp.

Still another object of this invention is to provide a new and improved frame straightening apparatus which is easily adaptable to permit the attachment of various accessories thereto.

A still further object of this invention is to provide a new and improved frame straightening apparatus whose basic members are simple brackets and longitudinal members, the longitudinal members being interrelatively engaged for longitudinal sliding movement, thereby providing a highly efficient design of few individual parts and apparatus which may withstand relatively large forces.

Another object of this invention is to provide, with a new and improved frame straightening apparatus, new and improved means for mounting such apparatus in a conventional access pit or on a conventional elevated ramp, whereby the said apparatus may be adjustable and movable altitudinally, longitudinally and transversely with respect to the said pit or ramp.

Yet another object of this invention is to provide a new and improved frame straightening apparatus which is exceedingly simple in construction, comprises a minimum number of elements, operable by conventional hydraulic jack units, and one which is strong, rugged and durable over a long period of use.

With the foregoing and other objects in view, all of which shall more fully hereinafter appear, our invention comprises certain novel constructions, arrangements and combinations of parts, as shall now be described, defined in the appended claims and illustrated, in preferred embodiment, in the accompanying drawings, in which Figure 1 is an isometric view of a frame straightening unit, being one embodiment of this invention, as installed in and used upon a typical floor in accordance with the invention, with broken lines showing a frame side beam as positioned for straightening, and with other broken lines indicating a possible location of an access pit.

Figure 1:
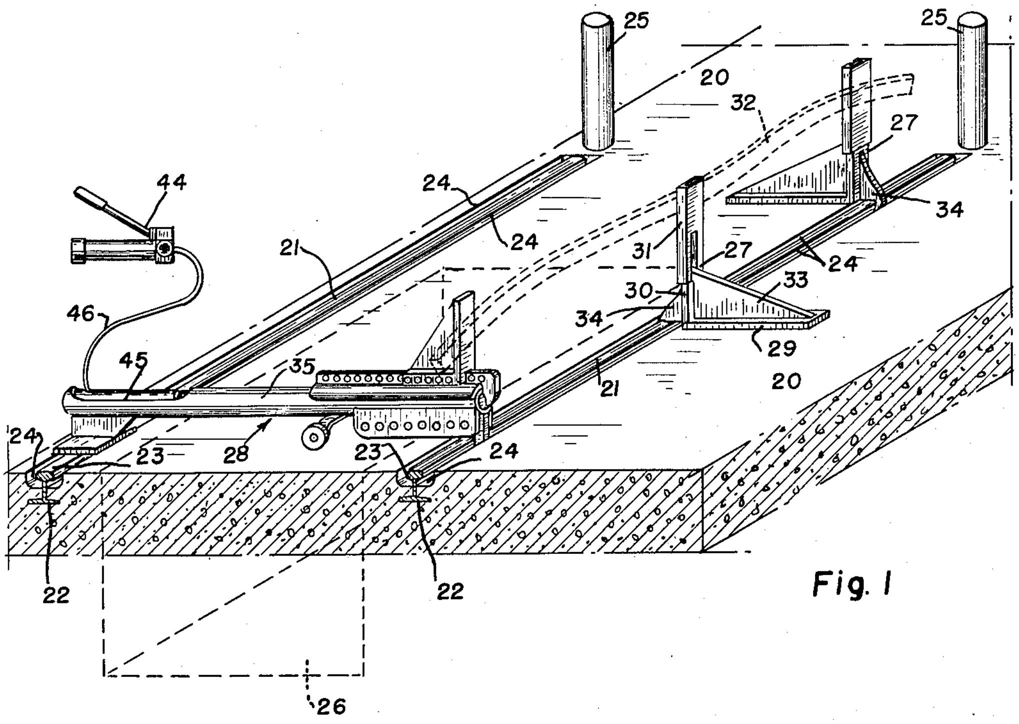
Figure 2:
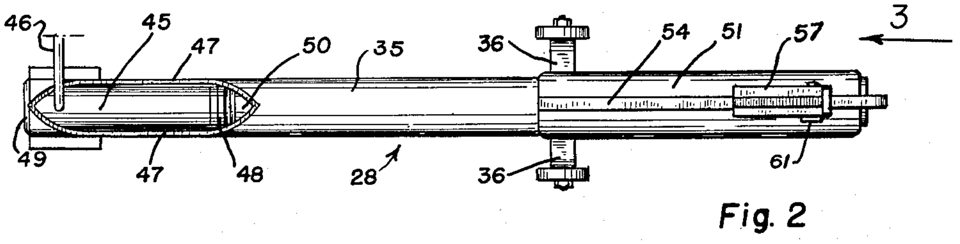
Figure 2 is a plan view, on an enlarged scale, of the actuating ram illustrated in the unit at Fig. 1.

In the art of bending and straightening steel structural members, it is common practice to rigidly affix a plurality of abutments in a floor or horizontally disposed frame to hold a structural member in fixed position, whereupon a ram is thrust against the member to bend or straighten it as may be desired. In that class of devices such as our invention, which are used primarily to straighten the frames of vehicles as trucks and automobiles, generally while assembled, it is desirable to array lineal groups of abutments and rams in spaced parallelism and in alignment with the principal longitudinal members of the said vehicles. An object of our invention is to provide a new and improved ram apparatus combined with an improved abutment array, which ram apparatus is also suitable for use in conjunction with conventional abutment arrays.

One embodiment of our invention is illustrated at Figs. 1 to 6 as adopted for use on a flat concrete floor 20 and is a complete frame straightening unit whose fixed members comprise two anchor rails 21 placed in the floor in spaced parallelism with the tops thereof preferably flush with the floor surface. The lower flange 22 of each rail is rigidly embedded in the concrete of the floor, while the upper flange 23, hereinafter called the head, is set in an elongate pocket 24 whereby movable members of the unit may be attached to the head 23 at any desired point therealong. A hitch post 25 may also be set in the concrete floor at the end of each rail to provide an anchor against longitudinal movements of a vehicle during a straightening operation, or for other purposes which need not be considered here. It is to be noted that one, two, or a plurality of rails could be used in such a unit, and that while the unit is primarily intended for use on a flat floor, an access pit 26, as indicated by broken lines in Fig. 1, may be provided if desirable.

The movable members of this unit comprise a plurality of abutments 27 and an actuating ram 28 which are engageable with the head 23 of the rail to resist and impose forces, transversely to the rail, which are necessary in a straightening operation. The abutments are formed as upstanding brackets, with one member horizontally disposed to provide a floor base 29 and the other member an upright tank 30 with bearing head 31 which is altitudinally adjustable to reach a vehicle frame member, as the beam 32 illustrated in broken lines at Fig. 1. The tank 30 and base 29 are suitably reinforced by a gusset 33 integral with said members. A hook 34 outwardly depends from the corner of the bracket, being formed to engage the rail head 23.

The actuating ram 28, which is a part of the unit above described, as well as an invention in and of itself, is formed in the embodiment illustrated at Figs. 1 to 6 as a hollow cylindrical body 35 containing pushing elements hereinafter described. The body 35 is mounted upon a wheeled carriage 36 disposed near the center to provide easy movements, and a support plate 37 depends from the rear end to hold it in a level position when in use. The front end of this cylindrical body 35 may be connected to a rail head 23 through two skirts 38 which depend longitudinally from its front end in spaced parallelism, each with a horizontal row of uniformly spaced orifices 39 in interrelative registration. Seated between these skirts is a cant arm 40, provided with a row of uniformly spaced orifices 41, which may be moved to bring the orifices 41 into mutual registration with the orifices 39 of the skirts in various selected positions, and there held by a pin 42 inserted through a selected group of mutually registered orifices. This cant arm 40 is provided with a hook 43 which may engage the rail head 23 in a manner similar to the hook 34. By shifting the arm 40 to change the registration of the various orifices, the position of the actuating ram 28 may be selectively adjusted with respect to the rail 21 to which it is engaged.

A conventional hydraulic lift is used to supply motive power to the actuating ram 28 and, in preferred embodiment, this lift comprises a pump and reservoir unit 44 which is connected to a jack 45 by a line 46. An elongate opening 47 is provided at the rear end of the cylindrical body 35 wherein the jack 45 is placed with its plunger 48 directed toward the front of the body. The jack is held in position by an end cap 49 at the rear end of the body 35, and the plunger 48 is directed and bears against the end of a hollow cylindrical sleeve 50 which slidably fits inside the body 35 and extends to the front end of the said body, being flush therewith when the jack is in retracted position. Extension of the jack 45 with resulting extension of the sleeve 50 effects pushing movements of elements about to be described whereby the ram 28 becomes effective as in a straightening operation. It is to be noted that with the pump and reservoir unit 44 connected to the jack 45 by a line 46, which is preferably flexible, the operator may place the pump and reservoir unit 44 in any desired position during a straightening operation, and he may even move the unit 44 as he desires to permit the viewing of the straightening operation at various positions while continuing to operate the jack in the body 35.

A working head 51 is formed as an elongate sleeve segment slidably and oscillatably seated on the outer surface of the cylindrical body 35. The front end of this working head is provided with a cap 52 depending therefrom over the end of body 35 and engaging the sleeve 50 by a knob 53 carried by the cap. A reinforcing attachment strip 54, longitudinally upstanding from this working head and overhanging the front end, as at 54a, to rigidly brace the cap 52, is provided, having a row of uniformly-spaced horizontally-aligned orifices 55, whereby an adjustable post 56, or other various accessories, may be attached to the strip 54 and thus to the working head. This adjustable post 56, is an upstanding bracket, one of its members being a horizontally-disposed longitudinally-slotted arm 57, and another of its members being an upright arm 58 which may act as a pressure bearing member or as a tang to carry a bearing head, as tang 30 carries head 31. These members are suitably strengthened by a gusset plate 59. The slotted arm 57 may be slidably seated on the reinforcing strip 54. Arm 57 has a plurality of orifices 60 mutually registrable with the orifices 55 of the strip 54, whereby a pin 61 may be inserted in a selected group of mutually registered orifices 55 and 60 to hold the post 56 in selected adjusted position.

In the use of this embodiment of the invention the ram 28 may be attached to a rail head 23 by the hook 43 of cant arm 40 and then the post 56 may be adjusted to contact a beam 32 by placing the pin 61 in a selected set of orifices 55 and 60. Next, actuation of the pump and reservoir unit 44, to extend the jack 45, causes outward movement of the sleeve 50 which forces the post 56 of working head 51 against beam 32, forcing the beam to desired position. In adjusting the post 56 to fit a given beam it may be set in upright vertical position or it may be tipped about the body 35 on an axis concentric with that of the body 35 and sleeve 50, to an inclined position as illustrated in broken lines in Fig. 3 where the arm 58 of post 56 is shown.

It is to be noted that this ram 28 is formed by concentric cylindrical members 35 and 50, and by a cylindrical segment 51, and that all of these members slide together in concentric pattern as the ram's movable elements are extended. When resisting a load, the sleeve 50 withstands compressive forces and is supported, by the cylinder 35, against buckling while the cylinder 35 withstands tensile forces and bending forces as imposed by the reaction on the post or bracket 56 and the cant arm 40. Under such loading conditions the advantages of cylindrical structural members providing, as they do, a maximum of resistive strength for a given loading, are well known. Therefore the utility of this invention is clearly apparent from a practical designer's viewpoint.

Another embodiment of our invention, including substantially the elements illustrated at Figs. 1 to 6 but adapted for use in a work pit, is illustrated at Figs. 8 to 15 and comprises a modified ram unit 28′ which may be mounted in a pit 62 to be operated in conjunction with other ram units 28′ or with abutment members similar in function to abutments 27, conventionally used in such operations in a pit and which need not be described here. In this embodiment it is desirable to place a rail 21 at the top of each side wall of the pit 62, which rails may be securely imbedded in the concrete wall, but with a portion of one side of the lower flange 22 of each rail projecting into the pit 62 to form two horizontally disposed tracks 63 in spaced parallelism whereupon a carriage 64 containing the ram unit 28′ may be movably mounted.

This carriage 64 is a beam spanning the pit 62, and is slotted at the ends to provide a loose fit on the tracks 63 to permit the carriage to be normally supported on these tracks by transversely disposed trucks. Each truck comprises a horizontally disposed spring bar 65, attached at its center to the carriage 64, and having lugs 66 depending from each end of the bar in which lug rollers 67 are mounted. When the carriage moves with rollers 67 rolling on tracks 63 there is a minimum of friction; however, when a load is applied, as by actuation of the ram unit 28′, the springs 65 deflect and the slotted ends of the carriage 64 bear directly against the tracks to lock the carriage, frictionally, against movement along the tracks and carry the load.

Figure 8:
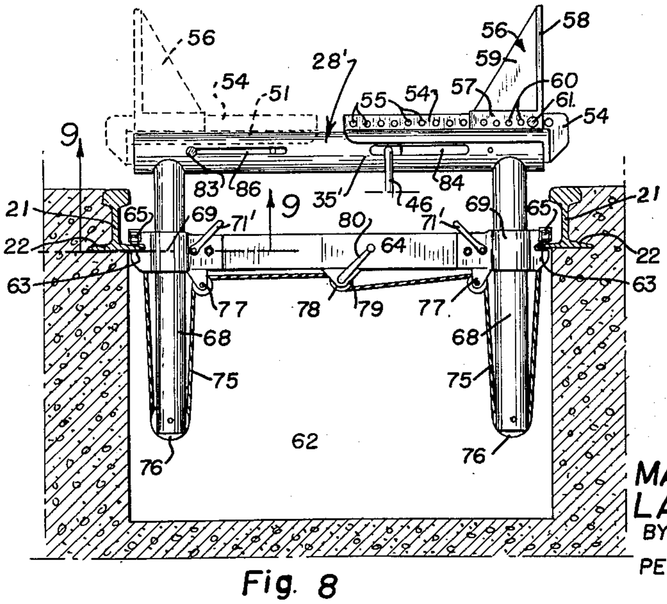
Figure 8 illustrates an embodiment of the invention as modified to fit an access pit.
Figure 9:
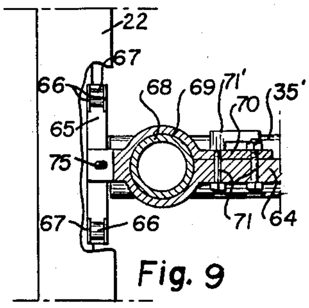
Figure 9 is a fragmentary section, on an enlarged scale, from the indicated line 9—9 at Fig. 8.

At each end of the cylindrical body 35′ of the ram unit 28′ there depends a cylindrical stake 68 slidably mounted in a sleeve 69 formed in each end of the carriage 64 to provide altitudinal adjustment of the body 35′. Several means for locking the stakes 68 at selected heights are possible, and one such means is illustrated at Figs. 8 and 9. Here, the sleeve 69 is split and the free end provided with a lug 70 clampable against the carriage 64 by bolts and nuts 71, one of the nuts having a suitable handle 71′ to facilitate the tightening operations. Another means for locking the stakes 68 in desired position is illustrated at Figs. 10 and 11, in which there is provided a plurality of uniformly spaced orifices 72 along the vertical axis of the stakes 68, and two correspondingly registrable orifices 73 along the vertical axis of each sleeve 69 wherein a U-bolt 74 may be slidably inserted when selected orifices 72 are in registration with the orifices 73, all as clearly illustrated at Fig. 11.

Figure 15:
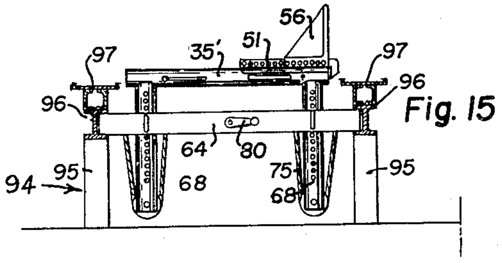
Figure 15 illustrates an embodiment of the invention such as illustrated at Fig. 10, but on a reduced scale, as adapted to fit a conventional elevated ramp.

To facilitate altitudinal adjustment of the body 35′ on the carriage 64, a hoist mechanism is attached to the underside of the carriage 64. This mechanism consists of two cables 75, one attached to each end of the carriage 64 outside of the stakes 68, each extending downward and threaded around the lower end of its adjacent stake over a sheave 76 rotatably attached thereto; thence, upwards and through pulleys 77 depending from the carriage 64 adjacent the inner side of the stakes 68; thence, horizontally, to a drum 78 mounted in lugs 79 depending from and centrally of the carriage. It is to be noted that the pulleys 77 are not functionally essential but that they are desirable to provide increased operator clearance underneath the carriage. Further, in a hollow carriage, it would be possible to encase the various mechanisms inside the carriage to provide further clearances as illustrated at Fig. 15. The cables 75 are wound on the drum in the same direction whereby rotation of the drum 78 in a given direction will wind up or pay out both cables simultaneously, the winding-up action of the cables causing the stakes 68 to lift simultaneously. A crank 80 is connected with the shaft of the drum 78 to provide means to turn the drum, and a ratchet means, not shown, may be provided to assist in holding the stakes in a given position. The raising and lowering may, of course, also be accomplished by power means if desired.

Figures 10, 11:
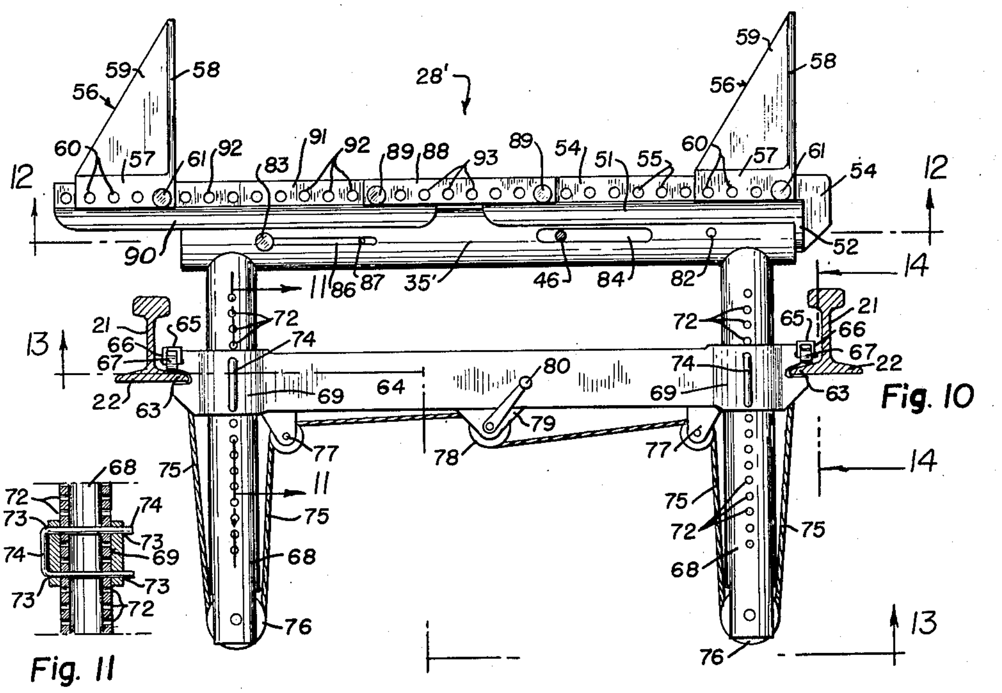
Figure 10 illustrates another embodiment of the invention as modified to fit an access pit, similar to Fig. 8 but on an enlarged scale.
Figure 11 is a fragmentary detail, in section, as viewed from the indicated line 11—11 at Fig. 10.
Figure 12:
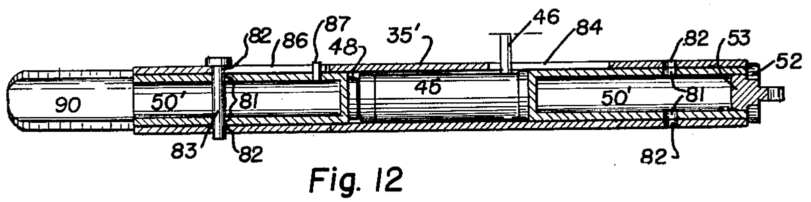
Figure 12 is a sectional view of the apparatus as taken on the indicated line 12—12 at Fig. 10.
Figure 13:
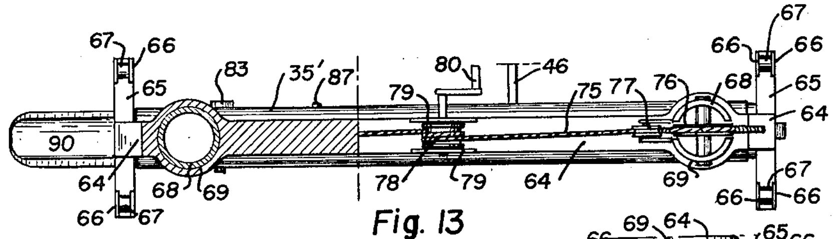
Figure 13 is a bottom view, partially in section, as taken on the indicated line 13—13 at Fig. 10.
Figure 14:
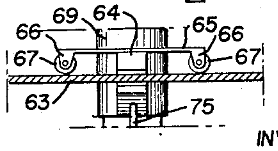
Figure 14 is a fragmentary detail as taken on the indicated line 14—14 at Fig. 10.

While the ram body 35′ is thus fixed against horizontal movement relative to the carriage 64, the ram unit 28′ is free to be adjusted longitudinally of the tracks by rolling the carriage along said tracks, and to be adjusted altitudinally by raising or lowering the unit in the carriage as just described. Since it cannot be reversed, the unit 28′ is modified to be double acting whereby the working head 51 may be placed at either end of the unit. To provide this, a sleeve 50′ is placed at each end of the cylinder 35′ with the jack 45 in between. In retracted position the ends of the sleeves 50′, being open to receive a knob 53 of the working head 51, are flush with the ends of the cylinder 35′, and in that position an orifice 81, radially through each sleeve, is in registration with a corresponding orifice 82 in the cylinder 35′. A shear pin 83 may be inserted through a selected group of orifices in mutual registration to lock the sleeve 50′ in retracted position in the cylinder 35′ whereby extension of the jack 45 will cause the opposite sleeve 50′ to be extended in the same manner as the sleeve 50 in the first described unit 28. With the shear pin 83 holding the sleeve 50′ adjacent to the plunger 48 of the jack, as illustrated in Fig. 12, the body of the jack 45 will be moved, and a slot 84 must be provided in the cylinder 35′ to permit movement of the line 46 which is attached to the body of the jack 45. It follows that the projection of the line 46 through the slot 84 acts as a guide, preventing the jack from rotating. Accordingly, the base of the jack is attached to the sleeve unit 50′ adjacent thereto by means not shown, to prevent this unit 50′ from rotating during its actuation whereby the orifices 81 and 82 will always be in registration whenever the unit is in retracted condition. The sleeve unit 50′, adjacent to the plunger 48, cannot be similarly held, and an elongate slot 86 is provided in the body 35′, wherein a pin 87, attached to the sleeve 50′, may slidably hold the sleeve 50′ in proper position for registration of the orifices 81 and 82.

Where it is desirable to effect a pull toward the unit 28′, it is necessary to fasten the working head 51 in the end opposite to the point of pull and to connect the working head through a link 88 and pins 89 to a sliding head 90 as clearly shown in Fig. 10. This sliding head 90 is an elongate sleeve segment with a reinforcing strip 91 longitudinally upstanding therefrom with a plurality of horizontally aligned orifices 92 therein in the same spacial relationship as the orifices 55 on the strip 54. Therefore, an adjustable post 56 may be attached to the sliding head 90 by a pin 61 in the same manner as hereinbefore described. The link 88 is conveniently similar to the strips 54 and 91, and may likewise be provided with a plurality of orifices 93 of similar size and pitch as the orifices 92 and 55 to facilitate adjustments with the connecting pins 89.

A third embodiment of our invention, adapted for use on an elevated ramp, is shown diagramatically at Fig. 15 and comprises a unit similar to 28′ but modified to be slidably mounted on a ramp 94 which may comprise uprights 95, a beam assembly 96, and wheel tracks 97. Since a track similar to 63 may not be feasible in an elevated ramp of a conventional type, it may be necessary to place the carriage 64 in between the flanges of the beam assembly, modifying the ends of the carriage 64 to fit the shape of the beam, as shown diagrammatically in Fig. 15.

Figures 16, 17:
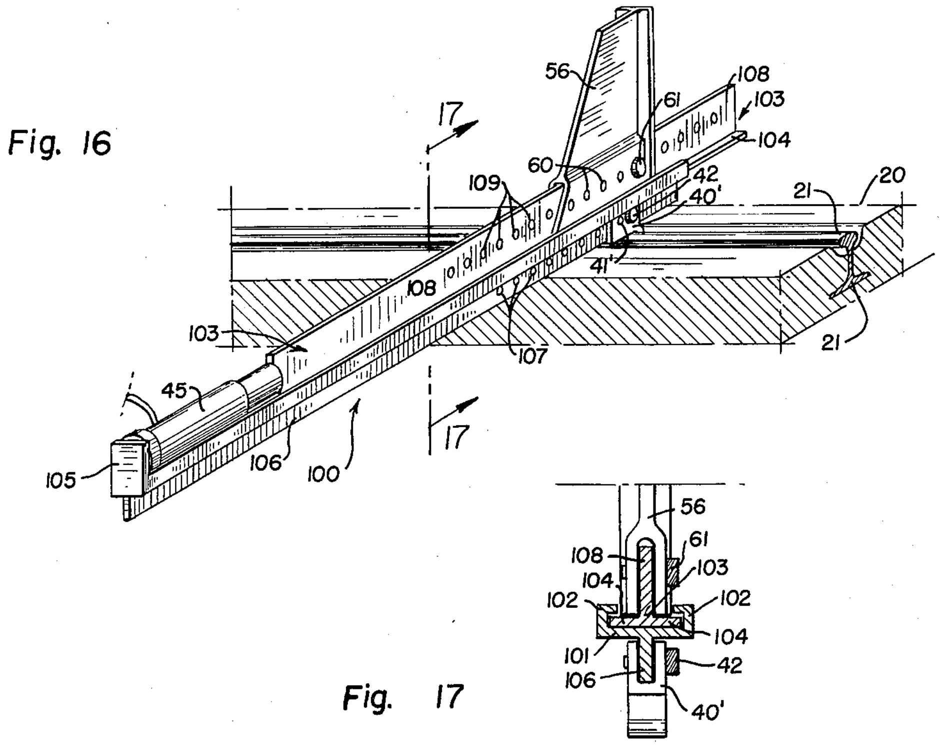
Figure 16 is an isometric view of yet another embodiment of the invention as installed in and used on a typical floor, with a fragment of the floor section being therein illustrated.
Figure 17 is a fragmentary section, on an enlarged scale, as taken on the indicated line 17—17 of Fig. 16.

The embodiment of our invention illustrated at Figs. 16 and 17 is adapted for use on a flat concrete floor 20 similar to the embodiment illustrated at Figs. 1 to 6, in that the actuating ram 100 (numerals 98 and 99 being omitted) may be hooked to the head 23 of a rail 21 embedded in the floor 20 as hereinbefore described. The body of the ram 100 is formed as a U-bar 101 with the upstanding sides 102 thereof turned inwardly to provide a guided way at the upper side of the bar. An inverted T-bar 103 functions as the moving element of the ram 100, and the base 104 of the T-bar is slidably inserted in the way formed by the bar 101 and sides 102. A cap 105 upstands from one end of the bar 101 to provide a bearing for a jack 45 which may be placed on the bar 101 with one end against the cap 105 and the other end against the end of the T-bar 103 whereby extension of the jack results in corresponding movement of the T-bar with respect to the bar 101.

A rib 106 depends longitudinally from the bar 101 the full length of the bar to provide a reinforcement and to function as a base and connecting member. In the rib 106 there is a plurality of orifices 107 adapted to provide selective registration with orifices 41′ of a cant arm 40′ whereby the cant arm may be held to the rib by a pin 42. The cant arm 40′ is centrally slotted across the top to receive the rib 106, and is hooked, as hereinbefore described, for attachment to the rail head 23.

Figure 18:
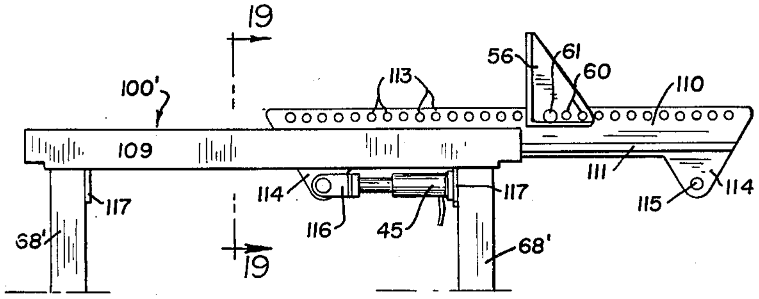
Figure 18 is an elevation view of an embodiment similar to that of Fig. 16, but adapted for the use in an access pit.
Figure 19:
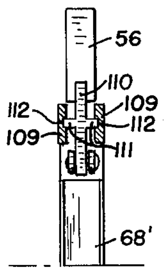
Figure 19 is a section, on an enlarged scale, as taken on the indicated line 19—19 of Fig. 18.
Figure 20:
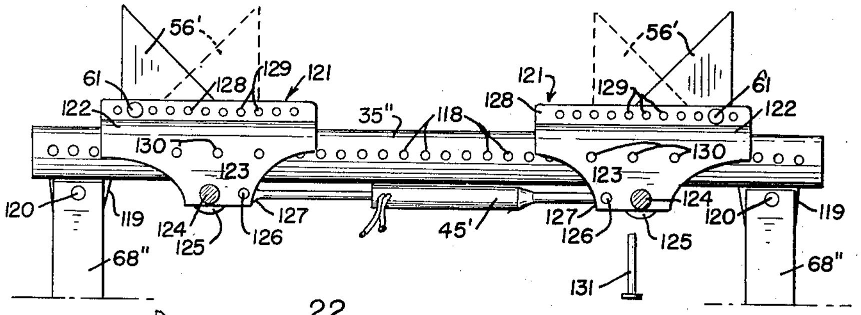
Figure 20 is an elevation view of yet another embodiment of the invention especially adapted for use in an access pit, and having movable members adapted to permit alternative push-pull actions.

In the upright central leg 108 of the T-bar 103 there is a plurality of orifices 109 adapted to provide selective registration with orifices 60 of a post 56, hereinbefore described, which may be placed upon the leg 108 and locked thereto by a pin 61. This apparatus is then ready for use, and the advantage of this embodiment is apparent and it will be noted that there is a minimum number of parts herein. A similar embodiment, using longitudinal members which are rectilinear in cross section and adapted for use in an access pit, is illustrated at Figs. 18 and 19. The body of the ram 100′ comprises two upright plates 109 held in horizontal spaced parallelism by stakes 68′ attached at each end of the plates and depending therefrom. These stakes 68′ may be mounted upon a carriage within a pit such as illustrated at Fig. 8 and hereinbefore described, and thus the stakes or carriage need not be further described at this point. Between the plates 109 there is positioned a slide bar 110 having laterally outstanding guides 111 from each side which engage horizontal grooves 112, formed in the plates 109 in spaced parallelism, whereby the slide bar 110 may be slidably moved and positioned in horizontal direction between the plates 109.

In the slide bar 110 there is a plurality of orifices 113 adapted to provide selective registration with orifices 60 of a post 56, hereinbefore described, which may be placed upon the bar 110 and locked thereto by a pin 61. A wing plate 114 depends from each end of the slide bar 110 and is provided with an orifice 115 whereby a clevis 116 may be pin-attached to the plate 114. This clevis is conveniently attached to the end of a hydraulic jack 45 which may be thus swingingly based against either stake 68′. Extension of the jack 45 causes corresponding movement of the slide bar with respect to the body 100′ and constitutes operation of the ram. To provide satisfactory abutment at the stakes, the bearing plates 117 may be attached to the stakes at the position of contact of the jack.

The embodiment of our invention illustrated at Figs. 20 to 25 employs a cylindrical body 35″ which may be a solid bar if desired, for all operative elements are mounted upon and outside of this body. A plurality of horizontally disposed orifices 118 is uniformly spaced along this body in a regular row to accommodate attaching means hereinafter described. At each end of the body 35'' there depends a bracket 119 which may be inserted into suitable slotted openings at the top of stakes 68'' and connected thereto as by pin 120. The stakes 68'' permit the assembly to be mounted upon a carriage within a pit or upon a ramp as hereinbefore described. By pin-connecting the body to the stakes, it is possible to provide a slight play between the stakes and the body as they are being altitudinally adjusted, and yet to provide sufficient rigidity to be usable once the stakes are tightened and fixed to the carriage.

There is preferably mounted upon this body 35'' two working heads 121 connected together by a push-pull jack 45' whereby the said working heads 121 may be pulled together or pushed apart and the working heads are accordingly adapted to operate effectively in response to either compressive or tensile operation of the jack. Each working head comprises a skirted semi-cylindrical cap 122 with the skirts 123 depending on each side to carry a centrally disposed transverse shaft 124 below the body 35'', whereon there is mounted a roller 125 having its outer periphery dished to conform to and contact the underside of the body 35''. The roller 125 thus holds the semi-cylindrical cap 122 snugly against the top side of the body 35'', permitting it to slide without binding even when the applied forces are eccentric with respect to each other. At one side of the skirts 123 in spaced parallelism with the shaft 124 there is provided a pin 126 to which the eye end 127 of the jack plunger may be attached, because in this embodiment it is desirable to provide such or similar attachment means with the jack 45'.

Figures 21, 22, 23, 24:
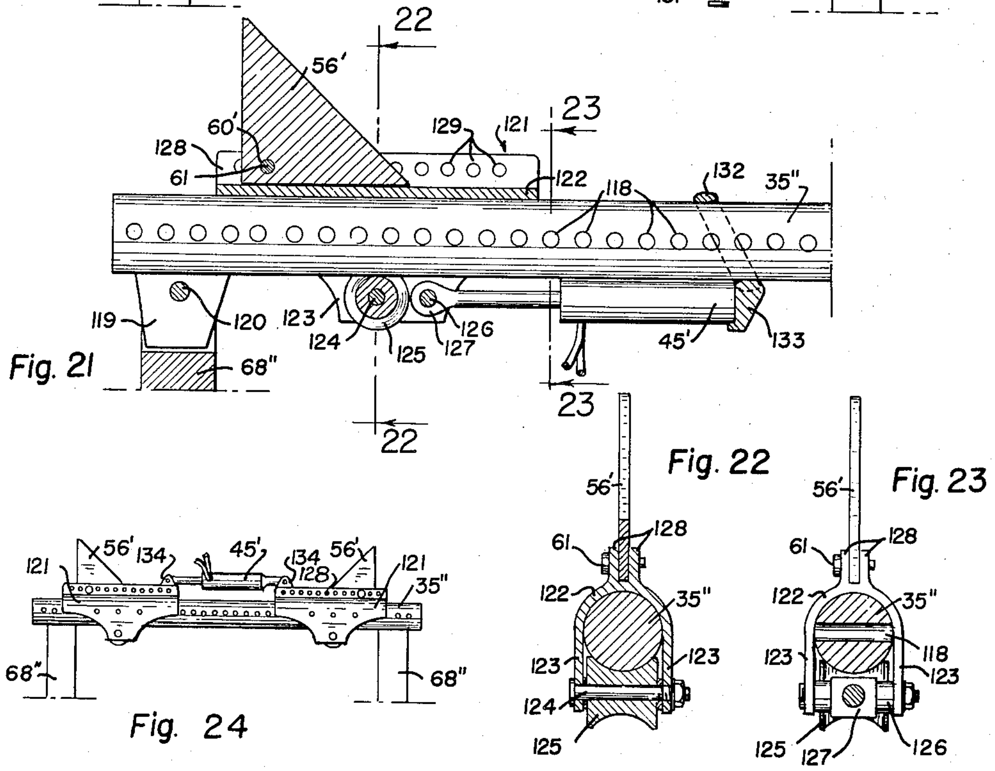
Figure 21 is a fragmentary elevation, partially in section and on an enlarged scale, of the apparatus illustrated at Fig. 20.
Figure 22 is a section as taken on the indicated line 22—22 at Fig. 21.
Figure 23 is a section as taken on the indicated line 23—23 at Fig. 22.
Figure 24 is an elevation view, similar to Fig. 20, but on a reduced scale, illustrating an alternative positioning of the moving means.

Upstanding longitudinally from the cap 122 are two flanges 128 in spaced parallelism with sufficient space therebetween to insert a post 56', which, in this embodiment, may be formed as a triangular plate of uniform thickness, and provided with an orifice 60' for attachment to the working head. A row of orifices 129 is positioned in the flanges 128 for selective registration with the orifice 60' whereby the post may be held to the head by a pin 61. In operation of the unit with two working heads, the posts may be directed outward so as to provide a spreading movement, or as illustrated by broken lines in Fig. 20 they may be reversed to provide a compressive movement. Both of the working heads may be rendered movable, or, if desirable, one may be secured to the body 35''. In each skirt there is provided a plurality of orifices 130 which may be moved to selective registration with some of the orifices 118 whereby it is then possible to lock it in this position by a pin 131, illustrated as removed in Fig. 20.

Where it is desirable to use only a single working head on the body 35'', various means may be used to attach the jack 45', one means being illustrated at Fig. 21. Here a ring 132 is employed which is provided with a base 133 suitable to carry and support the end of the jack. The ring is slightly larger than the body 35'', and may be slid and jammed into an inclined position which, through the inherent friction of the materials, will continue to jam, and will not slide out of position when a force is applied by the jack.

Figure 25:
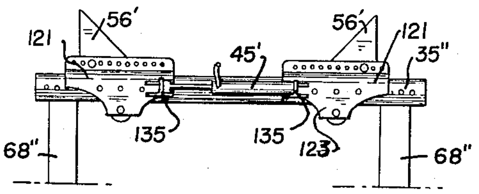
Figure 25 is similar to Fig. 24, but illustrating another alternative positioning of the moving means.

It is desirable to elevate the jack 45' to positions as close as possible to the reaction points of the work bearing against the posts to minimize the effects of binding due to eccentric application of force with respect to the reaction loads. Modifications for doing this are illustrated at Figs. 24 and 25. In Fig. 24 there are provided brackets 134 which may be upstandingly secured to the flanges 128 in a manner similar to the attachment of the posts 56', and on which may be pin-connected the jack 45'. In Fig. 25 there are provided brackets 135, side-attached to the skirts 123 whereon the jack 45' may be mounted by conventional means.

Figure 3:
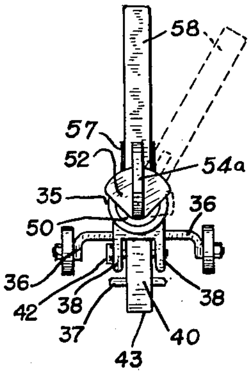
Figure 3 is an end elevation of the actuating ram as viewed from the indicated arrow 3 at Fig. 2, with broken lines thereon showing an alternate position of movable elements.
Figure 7:
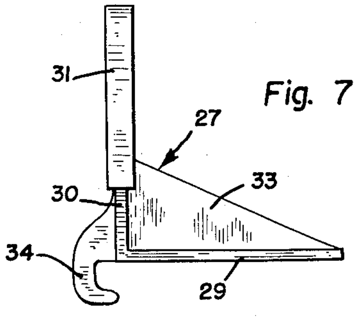
Figure 7 is an elevation view, on an enlarged scale, of an abutment illustrated in the unit at Fig. 1.
Figures 4, 5, 6, 26:
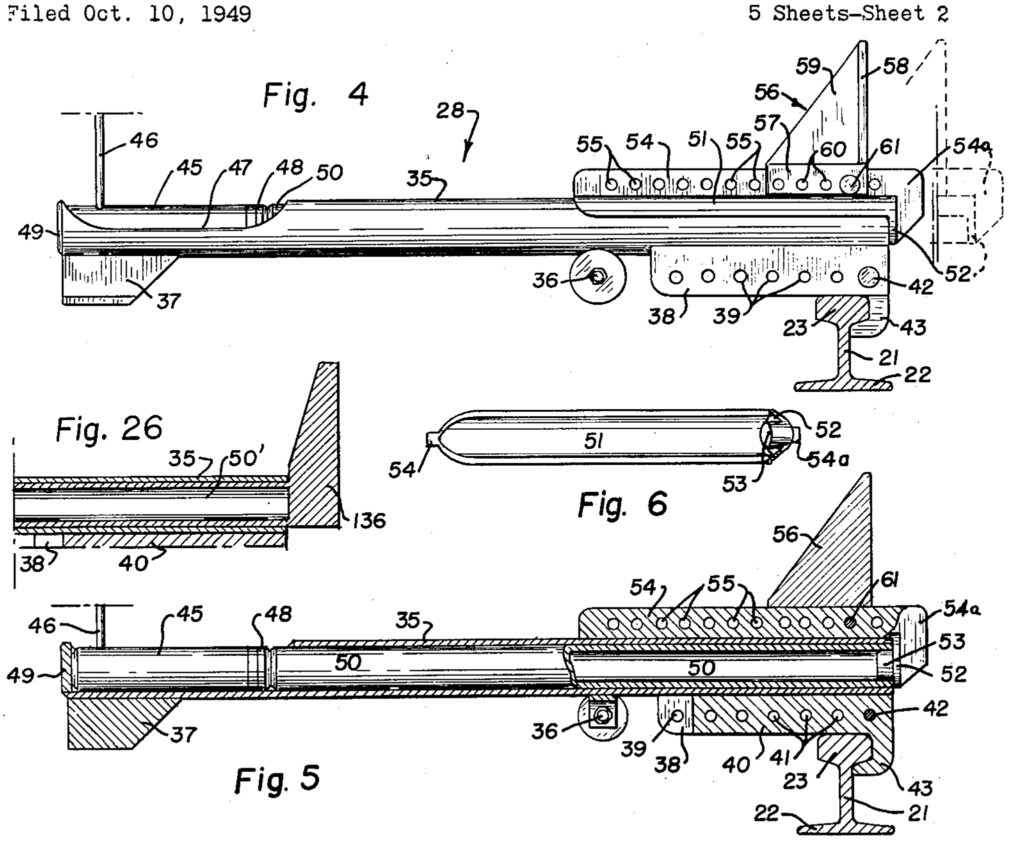
Figure 4 is a side elevation of the actuating ram, hooked to an anchor rail, with broken lines thereon showing an alternate position of movable elements.
Figure 5 is similar to Fig. 4, but in section to show portions of elements otherwise hidden from view.
Figure 6 is an auxiliary bottom view of one of the movable elements shown in Fig. 5.
Figure 26 is a fragmentary view of a modified embodiment of the right end portion of the structure illustrated at Fig. 5.

It will be noted that, as illustrated at Fig. 26, the sleeve 50' (corresponding to the sleeve 50 in other figures) may be engaged to or formed integral with the post 136 which takes the place of post 56 in the other figures. The skirt 51 and associated elements 52 to 55, both inclusive, are eliminated from this embodiment but by reason of the rotatable mounting of member 50' within body 35, post 136 may be arcuately oscillated in the same manner as post 56, as illustrated at Fig. 3. The longitudinal movement of post 136, to exert pressure on the vehicle frame member, is accomplished by moving member 50' by the jack within the body 35 in the same manner as post 56 is moved in the other embodiments. The adjustment of post 136 to its initial position longitudinally of the body 35 may be accomplished by using varying lengths of member 50' or in any other suitable manner.

We have illustrated and described many details of construction, but other equivalent and alternative structures, functioning similarly in principle, will occur to those skilled in the art and within the scope and spirit of the foregoing description, and of the appended claims, and we are not to be restricted in our protection to the details illustrated and described.

We claim:

1. In a vehicle frame straightening apparatus, in combination, a rigidly fixed rail, means selectively engageable therewith to hold a vehicle frame in substantial parallelism with said rail, a ram having a hollow cylindrical body, a member slideably and rotatably mounted therein, means for forcibly extending said member from the body, means for anchoring the body to the rail, and means for engagement between the member and the vehicle frame, said anchoring means comprising a hook depending from the body, said extending means comprising an hydraulic jack within the body, and said engagement means including an elongate head slidably mounted upon the body having a cap depending therefrom in engagement with the member and a post upstanding therefrom to effect engagement with said frame member.

2. A ram, comprising a hollow cylindrical body, means depending from said body adapted to hold the body in a substantially horizontal position, a slidable member within the body, means for forceably moving said member longitudinally within the body and for projecting one end therefrom, a skirt formed as a cylindrical segment slidably and oscillatably seated on the top of said body, a cap depending from said skirt adapted to engage the projected end of said member whereby to slide said skirt longitudinally along said body responsive to movement of said member, and a post upstanding from said skirt and adapted to engage, and to exert a horizontally directed force upon, an object above the body and skirt responsive to sliding of said skirt, and being further adapted to exert a horizontally directed force upon an object above and to one side of the body by oscillation of said skirt upon the body.

3. A ram, comprising a hollow cylindrical body, means adapted to hold the body in a substantially horizontal position, a slidable member within the body, means for forceably moving said member longitudinally within the body, a skirt formed as a cylindrical segment slidably and oscillatably seated on the top of the body, means carried by the skirt adapted to engage the end of the member whereby to slide the skirt longitudinally along said body responsive to movement of said member, means carried by the skirt and offset therefrom and adapted to engage and exert force upon an object outside the body and skirt responsive to the sliding of said skirt and means to limit the oscillation of the skirt.

4. In the ram defined in claim 3, said means carried by the skirt and offset therefrom, including an orificed rib on the skirt and a post having an orificed base member, the orifices in said rib and in said base member being adapted to register at a plurality of positions of the post along the skirt and means for engaging the post to the skirt through said registered orifices.

5. In the ram defined in claim 3, said means carried by the skirt and offset therefrom, including an orificed rib on the skirt and a post having a grooved base adapted to slidably receive said rib and having orifices in said base adapted to register with the rib orifices in a plurality of positions along said skirt and means for engaging the base to the skirt through said registered orifices.

6. In the ram defined in claim 3, said body-holding means including a carriage having two vertically adjustable stakes upstanding therefrom and fastened to the underside of said body, one near each end, and means for locking said stakes in selective altitudinal adjustment with respect to said carriage.

7. In the ram defined in claim 3, said body-holding means including a hook carried by the body and adapted to be engaged with a rail.

8. In the ram defined in claim 3, said body-holding means being positioned in an access pit and adapted to support said ram at selected positions along, above and transversely of the pit, comprising rails embedded in the pit side walls, a ram-supporting frame adapted to move along said rails and including vertically-adjustable ram-carrying stakes carried by the frame and means for restricting the movement of the frame and ram transversely of said rails.

9. In a combination as defined in claim 8, said frame being provided adjacent each rail with a carriage resting upon and moveable along said rail.

10. In a combination as defined in claim 8, a portion of the frame adjacent each rail being adapted to engage a rail and limit the movement of the frame transversely of the rail.

11. In a combination as defined in claim 8, means for moving said posts perpendicularly relatively to the frame and means for securing said posts to said frame at selected heights.

References Cited in the file of this patent

UNITED STATES PATENTS

| Number | Name | Date |
|---|---|---|
| 1,836,369 | Friese | Dec. 15, 1931 |
| 1,993,387 | Smith | Mar. 5, 1935 |
| 2,022,912 | Heineman | Dec. 3, 1935 |
| 2,042,856 | Merrill | June 2, 1936 |
| 2,013,785 | Merrill | Sept. 10, 1937 |
| 2,165,504 | Pfauser | July 11, 1939 |
| 2,244,934 | Bennett | June 10, 1941 |
| 2,348,697 | Smith | May 9, 1944 |
| 2,363,752 | Scott | Nov. 28, 1944 |
| 2,422,030 | Merrill | June 10, 1947 |
| 2,432,076 | Rothery | Dec. 2, 1947 |
| 2,469,670 | Thompson | May 10, 1949 |

OTHER REFERENCES

The disclosure in Fig. 44 on page 14 of the Service Manual, No. 860, of the Blackhawk Mfg. Company of Milwaukee, Wis. A copy of this manual was received by Div. 14 on March 5, 1940, and is filed in Class 153, subclass 32*c*.